(12) United States Patent
Zhu et al.

(10) Patent No.: US 12,013,092 B2
(45) Date of Patent: Jun. 18, 2024

(54) AUTOMOTIVE LAMP OPTICAL ELEMENT AND AUTOMOTIVE HEADLAMP

(71) Applicant: HASCO VISION TECHNOLOGY CO., LTD., Shanghai (CN)

(72) Inventors: He Zhu, Shanghai (CN); Dapan Zhang, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 76 days.

(21) Appl. No.: 17/596,007

(22) PCT Filed: Jan. 8, 2020

(86) PCT No.: PCT/CN2020/070935
§ 371 (c)(1),
(2) Date: Dec. 2, 2021

(87) PCT Pub. No.: WO2020/244229
PCT Pub. Date: Dec. 10, 2020

(65) Prior Publication Data
US 2022/0316676 A1  Oct. 6, 2022

(30) Foreign Application Priority Data

Jun. 5, 2019 (CN) .......... 201910488336.X
Jun. 5, 2019 (CN) .......... 201920859938.7
(Continued)

(51) Int. Cl.
*F21S 41/37* (2018.01)
*B60Q 1/04* (2006.01)
(Continued)

(52) U.S. Cl.
CPC .......... *F21S 41/192* (2018.01); *B60Q 1/0408* (2013.01); *B60Q 1/0686* (2013.01);
(Continued)

(58) Field of Classification Search
CPC .......... F21W 2107/10; F21W 2102/00; F21W 2102/13; F21W 2103/55; F21W 2103/00;
(Continued)

(56) References Cited

U.S. PATENT DOCUMENTS 10,139,646 B2  11/2018  Gromfeld
2004/0156209 A1  8/2004  Ishida
(Continued)

FOREIGN PATENT DOCUMENTS

| CN | 101311769 | 11/2008 |
| CN | 102032519 | 4/2011 |

(Continued)

OTHER PUBLICATIONS

Supplementary European Search Report issued to counterpart Application No. EP20819385.4 dated Jun. 15, 2023.

*Primary Examiner* — Omar Rojas Cadima
(74) *Attorney, Agent, or Firm* — McNees Wallace & Nurick LLC

(57) ABSTRACT

Provided is an automotive lamp optical element and an automotive headlamp. The automotive lamp optical element includes a light-incident portion, a light-passing portion and a light-emitting portion sequentially connected and integrally formed. The light-incident portion is configured to focus and emit light from a light source into the light-passing portion. The area of a longitudinal section of the light-passing portion gradually increases in an optical axis direction. The light-emitting portion protrudes in a direction
(Continued)

facing away from the light-incident portion and is configured to refract light emitted through the light-passing portion.

15 Claims, 4 Drawing Sheets

(30) Foreign Application Priority Data

Aug. 8, 2019 (CN) .......................... 201910730411.9
Aug. 22, 2019 (CN) .......................... 201921372161.8

(51) Int. Cl.
| | |
|---|---|
| B60Q 1/068 | (2006.01) |
| B60Q 1/14 | (2006.01) |
| F21S 41/143 | (2018.01) |
| F21S 41/153 | (2018.01) |
| F21S 41/19 | (2018.01) |
| F21S 41/20 | (2018.01) |
| F21S 41/24 | (2018.01) |
| F21S 41/29 | (2018.01) |
| F21S 41/43 | (2018.01) |
| F21S 45/47 | (2018.01) |
| F21W 102/20 | (2018.01) |
| F21W 107/10 | (2018.01) |

(52) U.S. Cl.
CPC .......... *B60Q 1/1423* (2013.01); *F21S 41/143* (2018.01); *F21S 41/153* (2018.01); *F21S 41/20* (2018.01); *F21S 41/24* (2018.01); *F21S 41/295* (2018.01); *F21S 41/37* (2018.01); *F21S 41/43* (2018.01); *F21S 45/47* (2018.01); *F21W 2102/20* (2018.01); *F21W 2107/10* (2018.01)

(58) Field of Classification Search
CPC ................ F21W 2103/20; F21S 41/143; F21S 41/322; F21S 41/26; F21S 43/315; F21S 43/26; F21S 41/27; F21S 41/24; F21V 7/0091

See application file for complete search history.

(56) References Cited

U.S. PATENT DOCUMENTS

| | | |
|---|---|---|
| 2015/0124472 A1 | 5/2015 | Wintzer et al. |
| 2016/0368414 A1 | 12/2016 | Son et al. |
| 2017/0030543 A1 | 2/2017 | Gromfeld et al. |
| 2017/0336041 A1* | 11/2017 | Mochizuki .............. F21S 41/24 |
| 2018/0087735 A1* | 3/2018 | Joerg .................... F21S 41/153 |
| 2018/0087745 A1 | 3/2018 | Gromfeld |

FOREIGN PATENT DOCUMENTS

| | | |
|---|---|---|
| CN | 103090286 | 5/2013 |
| CN | 104704288 | 6/2015 |
| CN | 105358900 | 2/2016 |
| CN | 107489955 | 12/2017 |
| CN | 207527498 | 6/2018 |
| CN | 208107967 | 11/2018 |
| CN | 208871529 | 5/2019 |
| DE | 102013013995 A1 | 7/2014 |
| DE | 102016006604 A1 | 12/2017 |
| DE | 102017208241 A1 | 11/2018 |
| EP | 2306075 A2 | 4/2011 |
| EP | 3150905 A1 | 4/2017 |
| JP | 2008518410 A | 5/2008 |
| WO | 2014019912 A1 | 2/2014 |
| WO | 2015198527 A1 | 12/2015 |

* cited by examiner

AUTOMOTIVE LAMP OPTICAL ELEMENT AND AUTOMOTIVE HEADLAMP

This is a U.S. National Stage Application, filed under 35 U.S.C. 371 of International Patent Application No. PCT/CN2020/070935, filed Jan. 8, 2020, which claims priority to Chinese patent applications No. 201910488336.X and No. 201920859938.7, filed Jun. 5, 2019, Chinese patent application No. 201910730411.9, filed Aug. 8, 2019, and Chinese patent application No. 201921372161.8, filed Aug. 22, 2019, the disclosures of which are incorporated herein by reference in their entireties.

TECHNICAL FIELD

The present application relates to the technical field of vehicle headlamps, for example, to an automotive lamp optical element and an automotive headlamp.

BACKGROUND

An automotive lamp optical element is an important part of an automotive lamp lighting module. The existing automotive lamp optical element generally includes a primary optical element and a secondary optical element, which are arranged at an interval in a front-rear direction of a vehicle and are fixedly mounted on a radiator through a respective bracket. Such automotive lamp optical element generates two mounting errors during the mounting, which will affect the overall mounting accuracy of the automotive lamp optical element, thereby affecting an automotive lamp light shape.

In the existing automotive lamp optical element, the primary optical element has a longer length in the front-rear direction in order to increase the utilization rate of light. The secondary optical element also has a large size to cooperate with the primary optical element for light distribution. A distance between the primary optical element and the secondary optical element in the front-rear direction is relatively large in order to form a desired light shape. Thus, the automotive lamp lighting module is large in size in the front-rear direction and is also large in volume correspondingly.

In the solution of the existing art, since at least two optical elements are provided, the mounting of the automotive lamp lighting module is relatively complicated, and the position accuracy among various accessories needs to be ensured, especially the relative position accuracy between the two optical elements, so that the ideal automotive lamp light shape can be obtained. To position and mount the primary optical element and the secondary optical element, it is also necessary to arrange accessories such as the respective mounting brackets and the like, so that the structure of the automotive lamp lighting module is complicated.

The optical system accuracy of the existing automotive lamp optical element is low. On one hand, the optical system accuracy is affected by the manufacturing accuracy of the accessories of the primary optical element and the secondary optical element themselves, and on the other hand, the optical system accuracy is affected by the relative position accuracy between the light source and the primary optical element and between the light source and the secondary optical element, so that the optical system accuracy of the automotive lamp optical element is difficult to be ensured.

To improve the optical system accuracy of the existing automotive lamp optical element, it is necessary to ensure high manufacturing accuracy, high positioning accuracy, and high mounting accuracy of the primary optical element and the secondary optical element.

SUMMARY

Based on the above, the present application provides an automotive lamp optical element and an automotive headlamp, which are simple in structure, small in size, easy to mount, and moreover, the optical system accuracy can be greatly improved.

Provided is an automotive lamp optical element. The automotive lamp optical element includes a light-incident portion, a light-passing portion and a light-emitting portion. The light-incident portion, the light-passing portion and the light-emitting portion are sequentially connected and integrally formed. The light-incident portion is configured to focus and emit light from a light source into the light-passing portion. An area of a longitudinal section of the light-passing portion gradually increases in an optical axis direction. The light-emitting portion protrudes in a direction facing away from the light-incident portion and is configured to refract light emitted through the light-passing portion. The longitudinal section of the light-passing portion is a plane perpendicular to the optical axis.

Provided is an automotive headlamp. The vehicle headlamp includes the above automotive lamp optical element, a circuit board, and a radiator, where the automotive lamp optical element is disposed on one side of the circuit board, the radiator is mounted on the other side of the circuit board, a light source is disposed on the circuit board, and the light source is disposed directly facing to the light-incident portion.

REFERENCE LIST

Figure 1:
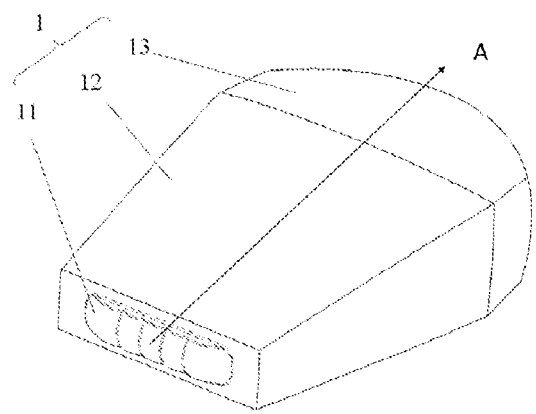
FIG. 1 is a schematic diagram of an automotive lamp optical element of an embodiment of the present application.

1—automotive lamp optical element;
11—light-incident portion; 111—light-incident surface; 12—light-passing portion; 121—inclined groove; 1211—inclined surface; 1212—vertical plane; 122—step portion; 1221—total reflection surface; 13—light-emitting portion; 131—first light-emitting portion; 132—second light-emitting portion;
2—circuit board; 21—light source; and 3—radiator.

DETAILED DESCRIPTION

In the description of this application, it is to be noted that, in the case of no explanation to the contrary, the position or position relationship indicated by the orientation words such as "center", "up", "down", "left", "right", "vertical", "horizontal", "inside", "outside", "front" and "rear" is based on the position or position relationship indicated by the direction of a vehicle in a normal driving state after an automotive lamp optical element of the present application is installed on the vehicle. Moreover, terms such as "first" and "second" are used only for the purpose of description and are not to be construed as indicating or implying relative importance, and terms "first position" and "second position" are two different positions.

In the description of the present application, it is to be noted that terms such as "mounted", "joined", and "connected" are to be understood in a broad sense unless otherwise expressly specified and limited. For example, the term "connected" may refer to "securely connected" or "detachably connected"; may refer to "mechanically connected" or "electrically connected"; or may refer to "connected directly", "connected indirectly through an intermediary", or "connected in two components". For those of ordinary skill in the art, specific meanings of the preceding terms in the present application may be understood based on specific situations.

Solutions of the present application will be described in detail in conjunction with drawings and embodiments.

As shown in FIGS. 1 to 8, an automotive lamp optical element 1 for an automotive lamp includes a light-incident portion 11, a light-passing portion 12, and a light-emitting portion 13. The light-incident portion 11, the light-passing portion 12, and the light-emitting portion 13 are sequentially connected and integrally formed. The light-incident portion 11 is configured to focus and emit light from a light source 21 into the light-passing portion 12. The area of a longitudinal section of the light-passing portion 12 gradually increases in an optical axis direction, the light-emitting portion 13 protrudes in a direction facing away from the light-incident portion 11 and is configured to refract light emitted through the light-passing portion 12.

The optical axis is an axis extending in a front-rear direction of the automotive lamp optical element 1 and passing through a focal point of the light-emitting portion 13, and the optical axis direction is defined as a direction along the optical axis and directing toward the light-emitting portion 13 from the light-incident portion 11. The longitudinal section is defined as a plane perpendicular to the optical axis.

The automotive lamp optical element 1 in this embodiment is a transparent plastic automotive lamp optical element. The plastic automotive lamp optical element is made of polymethyl methacrylate (PMMA) or polycarbonate (PC). In other embodiments of the present application, the automotive lamp optical element 1 may also be a silica gel automotive lamp optical element or a glass automotive lamp optical element. The material of the automotive lamp optical element 1 is selected according to actual needs.

Figure 2:
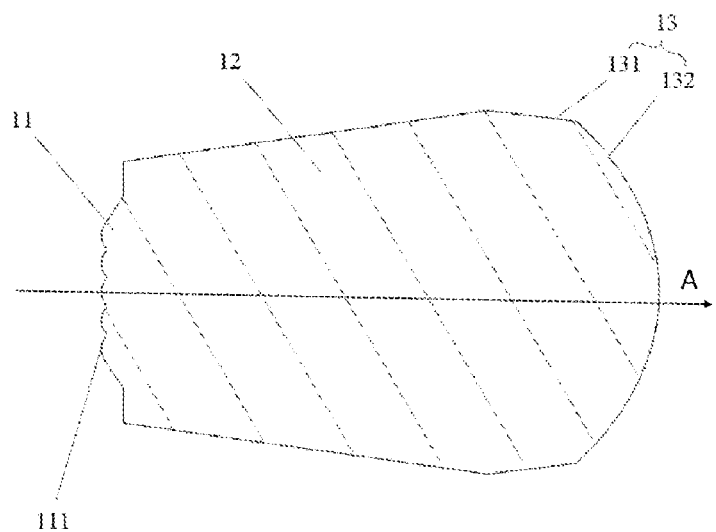
FIG. 2 is a sectional view of an automotive lamp optical element in one direction of an embodiment of the present application.
Figure 3:
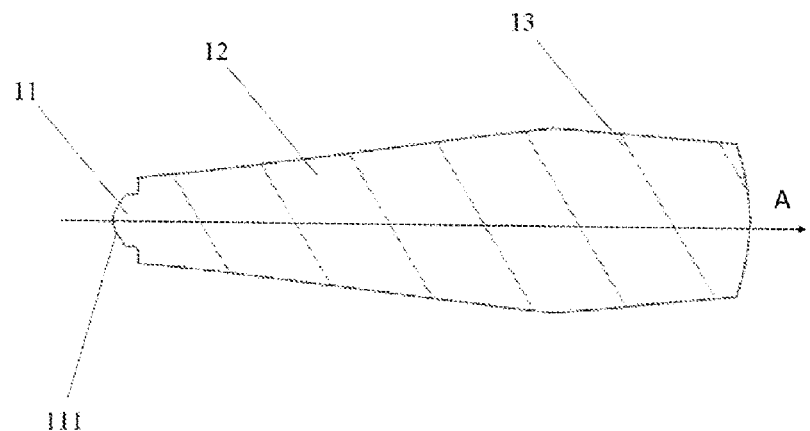
FIG. 3 is a sectional view of an automotive lamp optical element in another direction of an embodiment of the present application.

The light-incident portion 11 protrudes in a direction facing away from the light-passing portion 12. The light-incident portion 11 has a light-incident surface 111, and the light-incident surface 111 is a curved surface protruding in a direction facing away from the light-passing portion 12. As shown in FIGS. 1 to 3, the light-incident portion 11 in this embodiment is a curved light-incident portion, and correspondingly, the light-incident surface 111 is a curved surface. Five light-incident portions 11 are provided, and the five light-incident portions 11 are sequentially connected in a row. Each of the five light-incident portions 11 is disposed directly facing to one light source 21. In other embodiments of the present application, the number of light-incident portions 11 is not limited to five and may also be other numbers except for five. The light-incident portions 11 are not limited to be distributed in one row and may also be distributed in at least two rows, which may be specifically set according to actual needs. In one embodiment, each light-incident portion 11 may be disposed directly facing to one light source 21.

In the automotive lamp optical element 1 provided in this embodiment, the existing primary lamp optical element and the existing secondary lamp optical element are integrally formed, so that one lamp optical element is saved, and thus the automotive lamp optical element is simple in structure, small in size and only needs to be mounted at one time, thereby avoiding a secondary mounting error and improving the overall mounting accuracy and the optical system accuracy of the automotive lamp optical element 1. Thus the ideal lamp shape can be obtained.

The longitudinal section of the light-passing portion 12 in this embodiment has a rectangular shape. Four side surfaces of the light-passing portion 12 except end surfaces of the light-passing portion 12 are inclined surfaces, where the end surfaces of the light-passing portion 12 are connected to the light-incident portion 12 and the light-emitting portion 13, respectively. The incline directions of the four side surfaces of the light-passing portion 12 make the area of the longitudinal section of the light-passing portion 12 gradually decrease in the optical axis direction, so that more light incident on the light-emitting portion 131 through the light-passing portion 12 to improve the light utilization, thereby meeting requirements of the automotive lamp light shape.

As shown in FIG. 2, the light-emitting portion 13 in this embodiment includes a first light-emitting portion 131 and a second light-emitting portion 132. One end surface of the first light-emitting portion 131 is connected to the light-passing portion 12, and the other end surface of the first light-emitting portion 131 is connected to the second light-emitting portion 132. The other end surface of the first light-emitting portion 131 serves as a light-emitting surface and is a plane, and an end surface of the second light-emitting portion 132 facing away from the first light-emitting portion 131 is a light-emitting surface and is a curved surface. The four side surfaces of the first light-emitting portion 131 except the two end surfaces of the first light-emitting portion 131 are inclined surfaces, where the two end surfaces of the first light-emitting portion 131 are connected to the light-passing portion 12 and the second light-emitting portion 132, respectively. A longitudinal section of the first light-emitting portion 131 is a rectangle, the incline directions of the inclined surfaces make the area of the longitudinal section of the first light-emitting portion 131 gradually decrease in the optical axis direction, so that the light incident on the side surfaces of the first light-emitting portion 131 converges toward the optical axis direction to meet requirements of the automotive lamp light shape. The light-emitting surface of the second light-emitting portion 132 is a curved surface protruding in a direction facing away from the light-incident surface 111 and is configured to refract the light emitted from the light-passing portion 12. To meet the actual demand, the width of any one longitudinal section of the first light-emitting portion 131 is greater than the height of the any one longitudinal section of the first light-emitting portion 131. The width of the longitudinal section of the first light-emitting portion 131 is the length of the rectangle, and the height of the longitudinal section of the first light-emitting portion 131 is the width of the rectangle, so that the first light-emitting portion 131 has a narrow and elongated shape, thereby meeting the market requirements for a small car lamp module and a small-opening lens light-emitting surface. The ratio of the length to the width of the rectangular longitudinal section of the first light-emitting portion 131 is 2.5. In other embodiments, the ratio of the length to the width of the rectangular longitudinal section of the first light-emitting portion 131 may be any value greater than one and except for 2.5, which can be set specifically according to actual needs.

Figure 4:
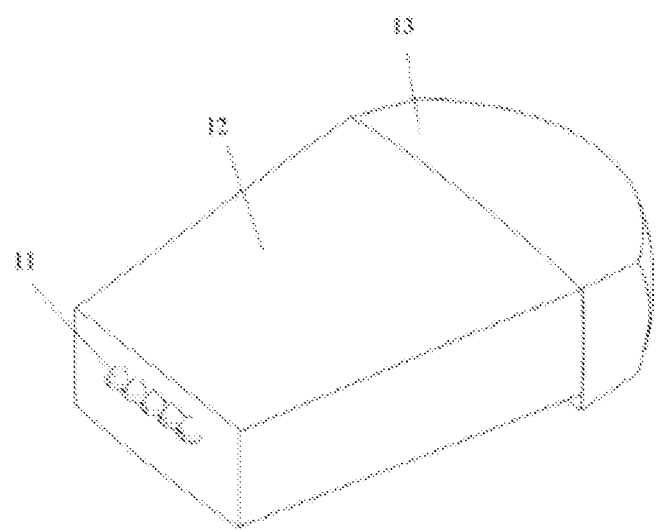
FIG. 4 is a schematic diagram of an automotive lamp optical element of another embodiment of the present application.

As shown in FIG. 4, in an automotive lamp optical element provided by another embodiment of the present application, the light-emitting portion 11 may also be a converging cup. A groove is disposed on one side of the converging cup facing away from the light-passing portion 12 and a protrusion is disposed in the groove in a direction facing away from the light-passing portion 12 so as to better converge the light. Although the converging cup has a good converging effect, the converging cup has a complicated structure and is difficult to process, and thus is less applied. In other embodiments, one side of the converging cup facing away from the light-passing portion 12 may be planar, and the planar light-incident surface 111 receives the light from the light source 21 and converges the light onto the light-passing portion 12.

Figure 5:
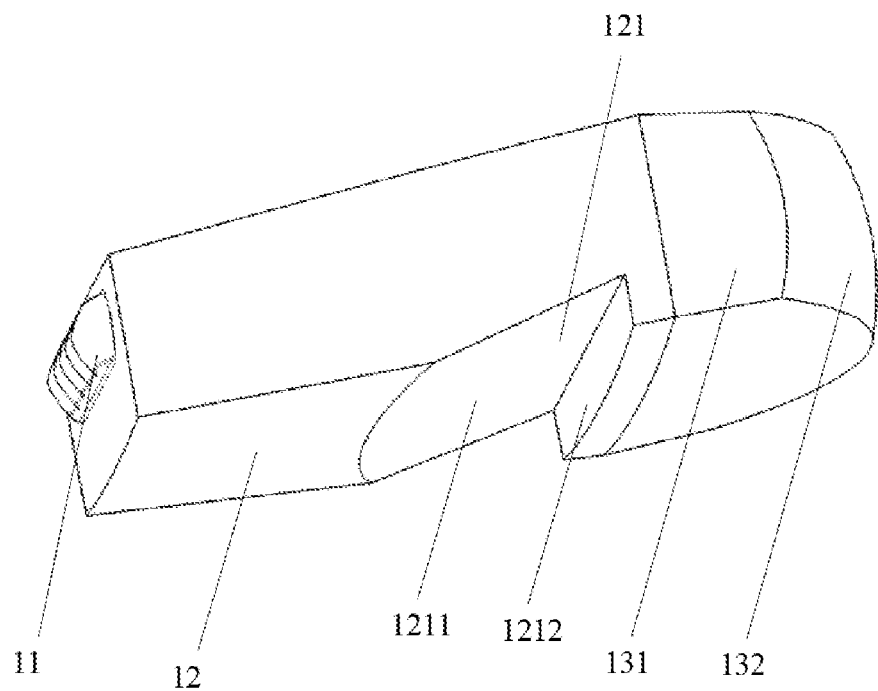
FIG. 5 is a schematic diagram of an automotive lamp optical element with an inclined groove of another embodiment of the present application.

As shown in FIG. 5, in order to make the automotive lamp optical element 1 form a low beam or an auxiliary low beam, an inclined groove 121 is disposed at a lower part of the light-passing portion 12, and the inclined groove 121 is arranged in the optical axis direction. In an embodiment, the inclined groove 121 is a sharp groove, and a wall surface of the inclined groove 121 includes an inclined surface 1211 adjacent to the light-incident portion 11 and a vertical surface 1212 adjacent to the light-emitting portion 13. The inclined surface 1211 is inclined along the optical axis direction toward an upper part of the light-passing portion 12. The inclined surface 1211 is a total reflection surface and is configured to totally reflect light incident on the inclined surface 1211. The inclined groove 121 formed by the inclined surface 1211 and the vertical surface 1212 has a simple manufacturing process. The shape of an intersection line between the inclined surface 1211 and the vertical surface 1212 fits with the shape of a low-beam cut-off line, so that the light incident into the light-passing portion 12 is cut off through the intersection line and then emitted from the light-emitting portion 13 to form the low-beam cut-off line. In other embodiments, the wall surface of the inclined groove 121 adjacent to the light-emitting portion may be designed as an inclined surface, and the specific structure may be set according to actual needs.

In order to make the automotive lamp optical element 1 form a high beam or an auxiliary high beam, the inclined groove 121 may also be formed at the upper part of the light-passing portion 12, and the inclined groove 121 may be arranged in the optical axis direction. In an embodiment, the inclined groove 121 is a sharp groove, and a wall surface of the inclined groove 121 includes an inclined surface 1211 adjacent to the light-incident portion 11 and a vertical surface 1212 adjacent to the light-emitting portion 13. The inclined surface 1211 is inclined along the optical axis direction toward the lower part of the light-passing portion 12, and the inclined surface 1211 is configured to totally reflect the light incident on the inclined surface 1211. Similarly, the shape of the intersection line between the inclined surface 1211 and the vertical surface 1212 fits with the shape of a high-beam cut-off line, so that the light incident into the light-passing portion 12 is cut off through the intersection line and then emitted from the light-emitting portion 13 to form the high-beam cut-off line. Of course, since the automotive lamp optical element 1 itself can form the high beam or the auxiliary high beam, the high-beam cut-off line may not be set, that is, the inclined groove 121 at the upper part of the light-passing portion 12 may not be provided.

Figure 6:
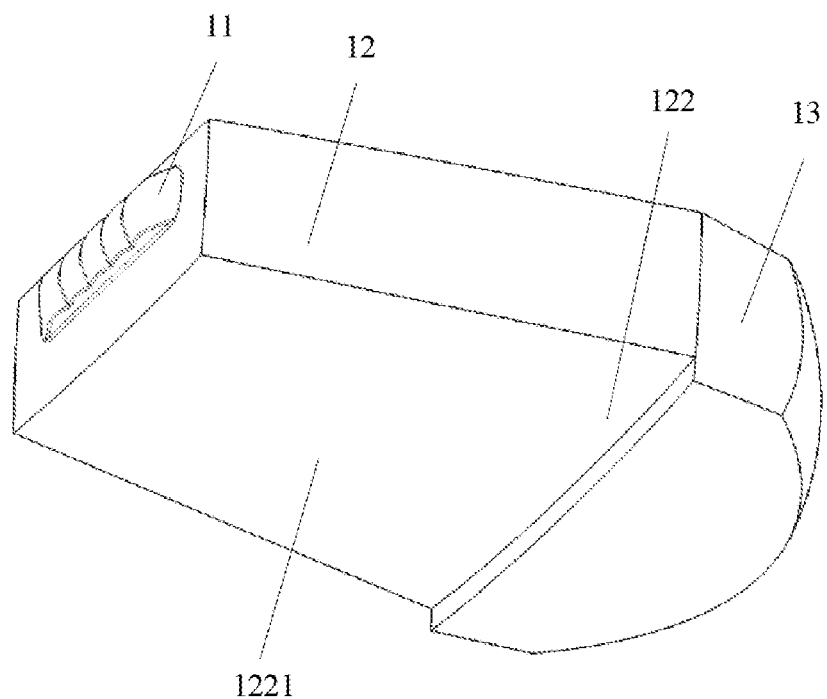
FIG. 6 is a schematic diagram of an automotive lamp optical element with a step portion of another embodiment of the present application.

In other embodiments, the height of a longitudinal section of the light-passing portion 12 connected to the light-emitting portion 13 is less than the height of a longitudinal section of the light-emitting portion 13 connected to the light-passing portion 12. That is, a total reflection surface 1221 is disposed on an upper surface or a lower surface of the light-emitting portion 12. As shown in FIG. 6, when the total reflection surface 1221 is disposed on the upper surface of the light-passing portion 12, the automotive lamp optical element 1 forms a high beam or an auxiliary high beam, and when the total reflection surface 1221 is disposed on the lower surface of the light-passing portion 12, the automotive lamp optical element 1 forms a low beam or an auxiliary low beam. A step portion 122 is formed by the total reflection surface 1221 and the wall surface of the light-emitting portion 13 protruding out of the light-passing portion 12, and the shape of an intersection line between the light-passing portion 12 and the light-emitting portion 13 fits with the shape of a cut-off line. The total reflection surface 1221 is configured to totally reflect light incident on the total reflection surface 1221.

The above cut-off line is a light and shade cut-off line defined in the relevant regulations on automotive lamps, and according to the definition of "GB 4599-2007—motor vehicle headlamps equipped with filament lamps", the light and shade cut-off line is a boundary line at which a significant change in light and shade can be perceived visually when a light beam is projected onto a light distribution screen. The shape of the intersection line may be set differently corresponding to the light and shade cut-off line. The inclined groove 121 or the step portion 122 added to the automotive lamp optical element 1 can replace the light-shielding plate provided independently of the automotive lamp optical element 1 in the existing art, and the structure of the lamp optical element 1 in the present application is simpler than that in the existing art.

Figure 7:
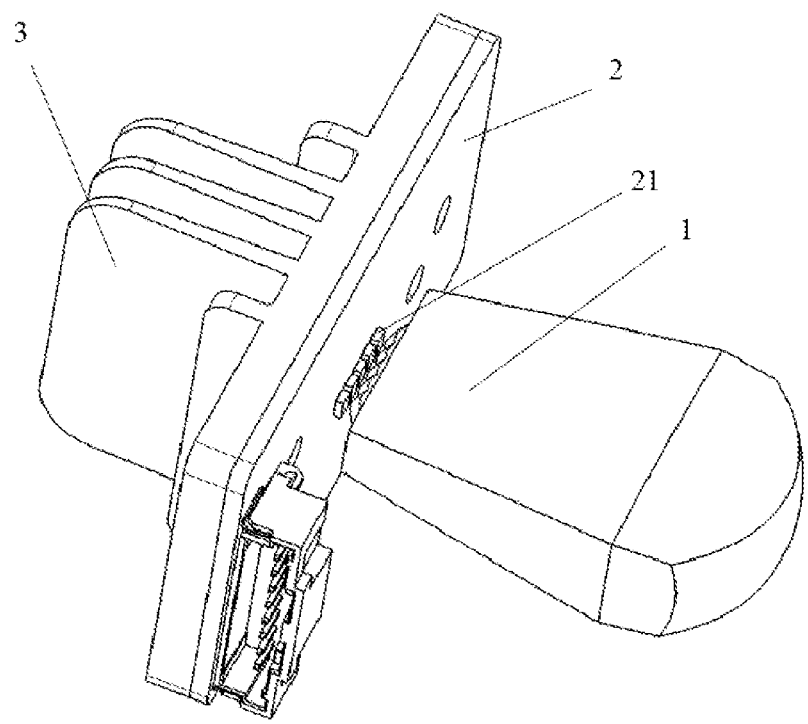
FIG. 7 is a schematic diagram of an automotive headlamp of an embodiment of the present application.
Figure 8:
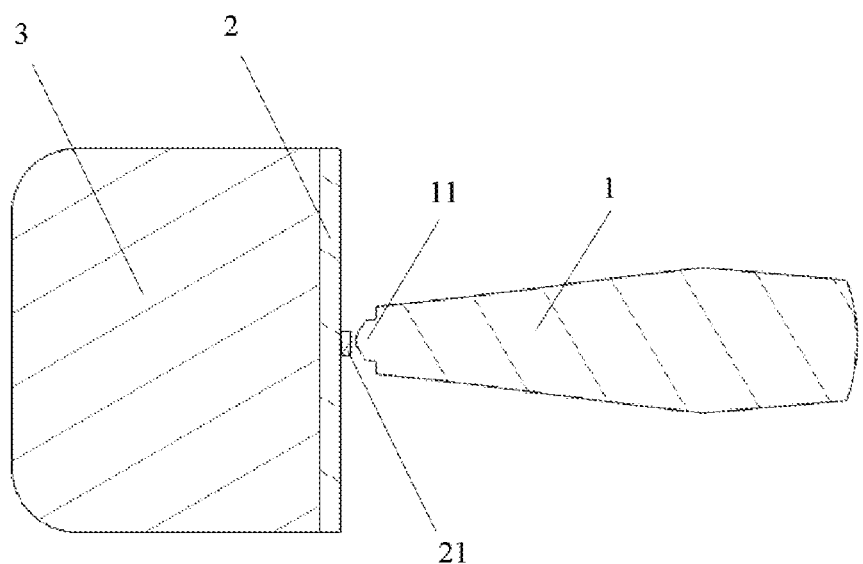
FIG. 8 is a sectional view of an automotive headlamp of an embodiment of the present application.

This embodiment also provides an automotive headlamp. As shown in FIGS. 7 and 8, the automotive headlamp includes an automotive lamp optical element 1, a circuit board 2, and a radiator 3. The automotive lamp optical element 1 is mounted on one side of the circuit board 2 through a mounting bracket (not shown in the figure), and the radiator 3 is mounted on the other side of the circuit board 2. The radiator 3 is used for dissipating heat generated by the circuit board 2, and the circuit board 2 is provided with a light source 21. The light source 21 is disposed directly facing to the light-incident surface 111.

What is claimed is:

1. An automotive lamp optical element, comprising:
   a light-incident portion;
   a light-passing portion; and
   a light-emitting portion,
   wherein the light-incident portion, the light-passing portion and the light-emitting portion are sequentially connected and integrally formed, the light-incident portion is configured to focus and emit light from a light source into the light-passing portion, an area of a longitudinal section of the light-passing portion gradually increases in an optical axis direction, and the light-emitting portion protrudes in a direction facing away from the light-incident portion and is configured to refract light emitted through the light-passing portion, wherein the longitudinal section of the light-passing portion is a section formed by a plane perpendicular to an optical axis cutting through the light-passing portion, wherein the light-emitting portion includes a first light-emitting portion and a second light-emitting portion, the first light-emitting portion and the second light-emitting portion are sequentially connected and integrally formed, the first light-emitting portion is connected to the light-passing portion, and an end surface of the second light-emitting portion facing away from the first light-emitting portion serves as a light-emitting surface and is a curved surface;

wherein four side surfaces of the first light-emitting portion each are an inclined surface, a longitudinal section of the first light-emitting portion perpendicular to the optical axis has a rectangular shape, and an area of the longitudinal section of the first light-emitting portion gradually decreases in the optical axis direction, and wherein the longitudinal section of the first light-emitting portion is a section formed by a plane perpendicular to the optical axis cutting through the first light-emitting portion.

2. The automotive lamp optical element of claim 1, wherein the light-incident portion protrudes in a direction facing away from the light-passing portion.

3. The automotive lamp optical element of claim 1, wherein the light-incident portion has a light-incident surface, and the light-incident surface is a curved surface protruding in the direction facing away from the light-passing portion.

4. The automotive lamp optical element of claim 1, wherein the light-incident portion comprises a converging cup, one side of the converging cup facing away from the light-passing portion is planar, or one side of the converging cup facing away from the light-passing portion is provided with a groove, and a protrusion is disposed in the groove in the direction facing away from the light-passing portion.

5. The automotive lamp optical element of claim 1, wherein the light-incident portion comprises at least two light-incident portions, the at least two light-incident portions are disposed in columns, and each of the at least two light-incident portions is disposed directly facing to one light source.

6. The automotive lamp optical element of claim 1, wherein the longitudinal section of the light-passing portion has a rectangular shape, and four side surfaces of the light-passing portion each are an inclined surface.

7. The automotive lamp optical element of claim 1, wherein a width of any one longitudinal section of the first light-emitting portion is greater than a height of the any one longitudinal section of the first light-emitting portion.

8. The automotive lamp optical element of claim 1, wherein an upper part or a lower part of the light-passing portion is provided with an inclined groove, the inclined groove comprises an inclined surface adjacent to the light-incident portion and a vertical surface adjacent to the light-emitting portion, a shape of an intersection line between the inclined surface and the vertical surface fits with a shape of a light cut-off line, and the inclined surface is inclined in the optical axis direction toward a lower part or an upper part of the light-passing portion so that light incident on the inclined surface is totally reflected.

9. The automotive lamp optical element of claim 1, wherein a height of a longitudinal section of the light-passing portion connected to the light-emitting portion is less than a height of a longitudinal section of the light-emitting portion connected to the light-passing portion, a total reflection surface is disposed on an upper surface or a lower surface of the light-passing portion, a step portion is formed by the total reflection surface and a vertical wall surface of the light-emitting portion protruding out of the light-emitting portion, a shape of an intersection line between the total reflection surface and the vertical wall surface fits with a shape of a light cut-off line, and the total reflection surface is configured to totally reflect light incident on the total reflection surface.

10. An automotive headlamp, comprising:
an automotive lamp optical element, a circuit board, and a radiator,
wherein the automotive lamp optical element is disposed on one side of the circuit board, the radiator is mounted on another side of the circuit board, a light source is disposed on the circuit board,
the automotive lamp optical element includes a light-incident portion, a light-passing portion and a light-emitting portion, wherein the light-incident portion, the light-passing portion and the light-emitting portion are sequentially connected and integrally formed, the light-incident portion is configured to focus and emit light from the light source into the light-passing portion, an area of a longitudinal section of the light-passing portion gradually increases in an optical axis direction, and the light-emitting portion protrudes in a direction facing away from the light-incident portion and is configured to refract light emitted through the light-passing portion, wherein the longitudinal section of the light-passing portion is a section formed by a plane perpendicular to an optical axis cutting through the light-passing portion, and
the light source is disposed directly facing to the light-incident portion;
wherein the light-emitting portion includes a first light-emitting portion and a second light-emitting portion, the first light-emitting portion and the second light-emitting portion are sequentially connected and integrally formed, the first light-emitting portion is connected to the light-passing portion, and an end surface of the second light-emitting portion facing away from the first light-emitting portion serves as a light-emitting surface and is a curved surface;
wherein four side surfaces of the first light-emitting portion each are an inclined surface, a longitudinal section of the first light-emitting portion perpendicular to the optical axis has a rectangular shape, and an area of the longitudinal section of the first light-emitting portion gradually decreases in the optical axis direction, wherein the longitudinal section of the first light-emitting portion is a section formed by a plane perpendicular to the optical axis cutting through the first light-emitting portion.

11. The automotive headlamp of claim 10, wherein the light-incident portion protrudes in a direction facing away from the light-passing portion.

12. The automotive headlamp of claim 10, wherein the light-incident portion has a light-incident surface, and the light-incident surface is a curved surface protruding in the direction facing away from the light-passing portion.

13. The automotive headlamp of claim 10, wherein the light-incident portion comprises a converging cup, one side of the converging cup attached to the light-passing portion is flat, or one side of the converging cup facing away from the light-passing portion is provided with a groove, and a protrusion is disposed in the groove in the direction facing away from the light-passing portion.

14. The automotive headlamp of claim 10, wherein the light-incident portion comprises at least two light-incident portions, the at least two light-incident portions are disposed in columns, and each of the at least two light-incident portions is disposed directly facing to one light source.

15. The automotive headlamp of claim 10, wherein the longitudinal section of the light-passing portion has a rectangular shape, and four side surfaces of the light-passing portion each are an inclined surface.

* * * * *